Figure 1:
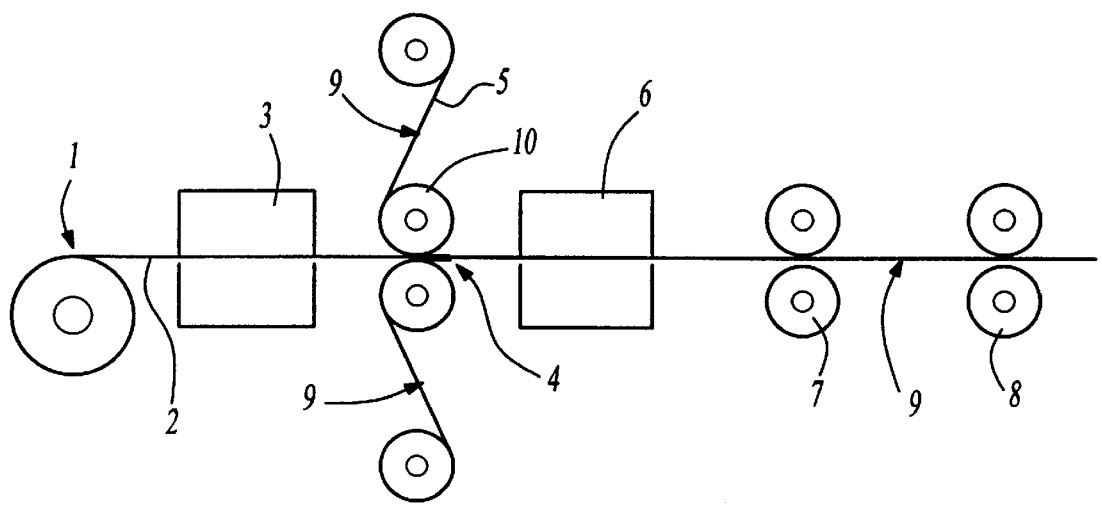

United States Patent

Kiriazis

[11] Patent Number: 6,083,336
[45] Date of Patent: Jul. 4, 2000

[54] DEVICE FOR THE COATING OF METAL STRIPS

[75] Inventor: Leonidas Kiriazis, Münster, Germany

[73] Assignee: BASF Coatings AG, Muenster-Hiltrup, Germany

[21] Appl. No.: 09/011,693

[22] PCT Filed: Aug. 9, 1996

[86] PCT No.: PCT/EP96/03535

§ 371 Date: Mar. 10, 1998

§ 102(e) Date: Mar. 10, 1998

[87] PCT Pub. No.: WO97/06955

PCT Pub. Date: Feb. 27, 1997

[30] Foreign Application Priority Data

Aug. 11, 1995 [DE] Germany .................. 195 29 583

[51] Int. Cl.[7] .................................................. B32B 31/08
[52] U.S. Cl. ...................... 156/209; 156/219; 156/272.6; 156/308.2; 156/322; 156/324; 156/555
[58] Field of Search .................. 156/209, 219, 156/272.6, 273.3, 273.5, 273.7, 308.2, 309.6, 322, 324, 324.4, 379.6, 555; 428/344, 458

[56] References Cited

U.S. PATENT DOCUMENTS

| 3,616,198 | 10/1971 | Saito .......................................... 428/461 |
| 4,250,274 | 2/1981 | Damico et al. ...................... 428/458 X |
| 5,158,831 | 10/1992 | Schirmer ................................. 428/457 |
| 5,234,516 | 8/1993 | Okamura et al. . |

FOREIGN PATENT DOCUMENTS

| WO 86/01772 | 3/1986 | European Pat. Off. . |
| 0 312 309 B1 | 10/1988 | European Pat. Off. . |
| 0 312 309 A1 | 4/1989 | European Pat. Off. . |
| 3-83635 | 3/1991 | Japan . |
| 7-070335 | 3/1995 | Japan . |
| 2 200 359 | 8/1988 | United Kingdom . |
| 94/21457 | 9/1994 | WIPO . |

Primary Examiner—Daiel Stemmer

[57] ABSTRACT

Apparatus for coating metal sheets with plastic film, consisting of a sequential arrangement of metal sheet feed (1), oven (3), film feeding unit (4), corona stations (9), laminating rolls (10), texturing or smoothing rolls (7) and printing mechanism (8).

13 Claims, 1 Drawing Sheet

DEVICE FOR THE COATING OF METAL STRIPS

The invention relates to an apparatus and a process for coating metal sheets with plastic films.

The coating of metal surfaces with plastics finds numerous applications for various products such as electrical equipment or packaging, for example. In the food industry, for example, foodstuffs are packaged in containers (cans), the metal body guaranteeing the stability of the packaging vessel and the plastic coating providing for food-compatible separation of the metal from the foodstuffs. A film applied additionally to the outer faces of metal containers is able, furthermore, to accommodate information and advertising by virtue of being printed.

A problem which naturally occurs with these applications is that of applying the plastic coating to the metal substrate with a sufficient adhesive strength. A number of process variants have already been developed for this purpose in accordance with the prior art. Among these, particular importance attaches to the processes in which a prepared plastic film is applied over a large area to the metal and is bonded to it. Here, fundamental forces of adhesion are responsible for the adhesion of the plastic to the metal. In this case sufficient adhesion is achieved in particular by means of an adhesive interlayer or by melting the plastic film onto the metal.

EP-0 312 309 describes, for example, a process for coating metal films with polypropylene. Features of this process are that the polypropylene film is bonded to the metal by melting and that rapid and uniform cooling takes place after the melting operation. This influences the crystallization process within the polypropylene. However, there is no possibility with this process to direct the surface texture of the laminate in a desired direction. This is highly disadvantageous, since the nature and appearance of the surface represent important properties of the product.

In connection with the coating of metals with apolar substrates such as polypropylene, for example, a surface treatment is additionally of advantage. Suitable such treatments include cleaning processes, which remove disruptive substances from the film, and mechanical pretreatments, such as roughening or chemical activation, for example. In the case of coating with polyolefins, moreover, flame treatment of the film is employed in particular. Chemical activation of polypropylene melt films can be carried out by treatment with ozone. Good control of the intensified adhesion and a good activation effect are also offered by pretreatment by means of so-called corona discharge. In this type of treatment, spontaneous gas discharges occur in a non-homogeneous high-voltage alternating field which is generated over the film. It is assumed that this produces substances such as peroxides, for example, which then lead to chemical activation of the plastic surface. Nevertheless, effective coating of the metal sheets with plastic film remains technically problematic. For instance, in the case of thin polyolefinic films, there are often instances of blocking in the course of corona pretreatment. In addition, the corona pretreatment produces an adhesion-promoting surface tension which, however, becomes reduced over the course of time (days or weeks) and may then, following application of the film to the metal sheet, lead to adhesion problems.

The object addressed by the invention is to provide an improved apparatus and an improved process for laminating plastic films onto metal sheets and, in so doing, to achieve improved adhesion values, in particular, and to be able to control the surface texture.

This object is achieved by an apparatus which consists of a feed for the metal sheet, an oven for preheating the metal sheet, at least one feeding unit with laminating rolls for films that are to be applied, optionally a further downstream oven for the conjoint heating of metal sheets and the film atop them, at least two downstream texturing or smoothing rolls, and optionally a printing mechanism.

This arrangement makes it possible to apply the film with firstly with very good adhesion values and secondly, by virtue of the downstream texturing or smoothing rolls, to control the nature of the surface. Pressing the coating film against the metal with a smoothing roll produces a uniformly smooth surface. Products with smooth or glossy surfaces are used in particular for so-called white goods, i.e. primarily domestic appliances. Other areas of application, such as in the phonographic industry, for example, require, on the other hand, a matt or textured surface. In this case the smoothing roll can be replaced by a texturing roll. In this context it proves advantageous to arrange, before these rolls, a further oven in which the metal sheet and the film atop it are heated, so that the plastic becomes plastically deformable. It is also possible for the temperature of the rolls themselves to be settable.

The printing mechanism which stands at the end of the processing line offers the possibility of printing the plastic surface for coloration, for information purposes and for advertising purposes.

In a further embodiment of the invention this line additionally comprises an apparatus for pretreating the film in order thus to generate improved adhesiveness on the metal sheet. In particular, this apparatus can be arranged directly before the laminating rolls. A particularly preferred apparatus for improving the adhesion properties is a corona discharge unit.

Arranging the corona pretreatment stage directly before the laminating stage reduces considerably the risk of thin polyolefinic films blocking. Production is therefore able to proceed with less disruption and hence more effectively in economic terms. This also avoids problems with films which have already been corona-treated following their preparation in order to improve their adhesion properties. In fact, the surface tension produced by this decreases over the course of time, so that at the point in time at which the films are laminated on the adhesion properties are no longer optimal. Owing to storage or transportation, processing can often take place not until several weeks after the production of the film. Suitable values for the surface tension are within the range of 38–45 mN/m. These values are "refreshed" again with the corona pretreatment according to the invention. It is therefore possible, following corona pretreatment of polypropylene films, to obtain excellent adhesion values on metal. The same also applies to coex films such as maleic anhydride-grafted polypropylene/polypropylene (MAA-g-PP/PP).

When processing polyolefinic plastic films it is particularly advantageous if a further corona treatment stage is arranged before the printing mechanism. This is because the printing of polypropylene-coated metal generally comes up against large difficulties. With the process according to the invention, however, firstly there is utilization of the heat still present from the freshly laminated metal, and secondly the corona treatment brings about better adhesion of the applied ink.

The invention also relates to a process for producing metal sheets coated with films. In this process the metal sheet is passed by way of a feed apparatus through an oven in which it is heated. Subsequently, a film is placed over the metal sheet by way of laminating rolls and is laminated. The metal sheet with the film thus atop it is then passed optionally into a further oven in which it is heated. It is subsequently cooled again, if appropriate, and the laminate is passed through texturing or smoothing rolls and optionally over a printing mechanism.

In a further embodiment of the process, pretreatment may take place before application to the metal sheet in order to improve the adhesiveness. This pretreatment can in particular comprise a corona discharge.

By means of the coating process according to the invention a product with very good adhesiveness is obtained. As a result of the arrangement of the warming and heating steps there is partial melting of the film, leading to an intensified adhesion effect. In particular, the corona discharge treatment directly before lamination brings about an improvement in adhesion.

For the cooling which may follow the second oven, the option exists to implement this cooling with the aid of a waterbath, by spraying on water, or by supplying air. Cooling preferably takes place to temperatures of below 10° C., in particular below 7° C. In accordance with the process of the invention, it is preferred for a further treatment by means of corona discharge to take place before the film is introduced into the printing mechanism. This corona discharge treatment should take place directly before printing in order to obtain better printing results.

A preferred use of the apparatus and process according to the invention is in the lamination of plastic films to metals, especially that of polypropylene films. In addition it is possible to use plastics that comprise fillers, examples being inorganic fillers such as metallic powders.

In the text below the invention is described with reference to the example and the FIGURE.

The sole drawing FIGURE shows an apparatus for coating metal sheets.

The metal sheet 2 to be coated is withdrawn from coil winches 1 and is supplied to the coating line by way of a feeding unit 4. This feeding unit may include further elements, examples being tensioning rolls. If desired, a coating unit may also be provided. The metal sheet 2 is then guided through an oven 3 in which it is heated. This oven can be a convection oven or an induction oven. The metal sheet 2 is then passed between two laminating rolls 10 which also effect the pressing on and applying of the film 5. This can take place from both sides of the metal sheet or else only from one side. The film is likewise stored on rolls and is passed to the laminating operation by way of a feeding system. In this context it is possible to carry out preheating of the films likewise by way of a convection oven, or by way of an IR lamp. It is preferred in accordance with the invention to arrange a corona station 9 directly before the laminating rolls. By virtue of the gas discharges generated in the high-voltage alternating field there is heating and chemical activation of the film surface. This brings about an improved adhesion effect in the course of the subsequent laminating of the film onto the metal sheet. The metal sheet, together with the film which is now atop it, is, finally, supplied to a further oven 6. This further heating causes partial melting of the plastic and hence better adhesion to the metal. In addition, the plastic film becomes plastic, thereby facilitating its processing by the subsequent smoothing or texturing rolls 7. Following the smoothing or texture-embossing operation it is possible to carry out cooling of the coated metal sheet. It is likewise possible to provide drying rolls or a drying oven. Using the printing mechanism 8, finally, the film coating is printed with ink. In this case, to improve the printing result, a further corona station 9 is arranged before the printing mechanism. Following the printing mechanism 8 it is possible to arrange further customary processing stations: for example, an optical examination unit for quality control, a separating unit for coils or panels, or a punching mechanism, for the production of preserve cans, for example.

The apparatus according to the invention for coating metal sheets with plastic film yields surprisingly good adhesion results. Furthermore, in a compact sequential process, it permits the laminating application of film, the smoothing of the surface or the application of a texture, and the printing of the surface.

I claim:

1. An apparatus for adhering a plastic film to a metal sheet, comprising an oven for preheating a metal sheet, means for moving the metal sheet into the oven and the preheated metal sheet out of the oven, one or more laminating rolls, means for storing a plastic film, means for moving the plastic film from the plastic film storage means to the one or more laminating rolls, means for feeding the plastic film from the one or more laminating rolls on to the preheated metal sheet to produce a plastic film laminated metal sheet, means for moving the preheated metal sheet under the means for feeding the plastic film, two or more rolls for texturing or smoothing the plastic film laminated metal sheet which are different from the one or more laminating rolls, and means for moving the plastic film laminated metal sheet to the two or more rolls for texturing or smoothing.

2. The apparatus of claim 1 further comprising a second oven located between the means for feeding the plastic film and the two or more rolls for texturing or smoothing.

3. The apparatus of claim 1 further comprising a printing mechanism located downstream of the two or more rolls for texturing and smoothing.

4. The apparatus of claim 1 further comprising an apparatus for pretreating the plastic film, said apparatus being located upstream of the means for feeding the plastic film.

5. The apparatus of claim 4 wherein the apparatus for pretreating the plastic film is a corona discharge apparatus located between the plastic film storage means and the one or more laminating rolls.

6. The apparatus of claim 3, further comprising a corona discharge apparatus located between the two or more rolls for texturing or smoothing and the printing mechanism.

7. A process for producing metal sheets coated with plastic film, comprising guiding a metal sheet from a feed apparatus into an oven, heating the metal sheet in the oven to produce a preheated metal sheet, laminating a plastic film onto the preheated metal sheet with one or more rolls for laminating so as to produce a plastic film laminated metal sheet, and processing the plastic film laminated metal sheet by subjecting the plastic laminated metal sheet to two or more texturing or smoothing rolls which are different from the one or more laminating rolls.

8. The process of claim 7 further comprising
cooling the plastic film laminated metal sheet to a temperature below 10° C. before said processing.

9. The process of claim 7 further comprising
guiding the processed plastic film laminated metal sheet over a printing mechanism.

10. The process of claim 7 further comprising
pretreating the plastic film by means of corona discharge before it is laminated onto the preheated metal sheet.

11. The process of claim 8 wherein cooling is carried out by means of a waterbath, by spraying on water or by supplying air.

12. The process of claim 9 further comprising
treating the processed plastic film laminated metal sheet with a corona discharge.

13. The process of claim 7 where the plastic film is of polypropylene.

* * * * *